Nov. 3, 1931.  E. DICKEY  1,830,462
ELECTRICAL APPARATUS
Filed April 30, 1929
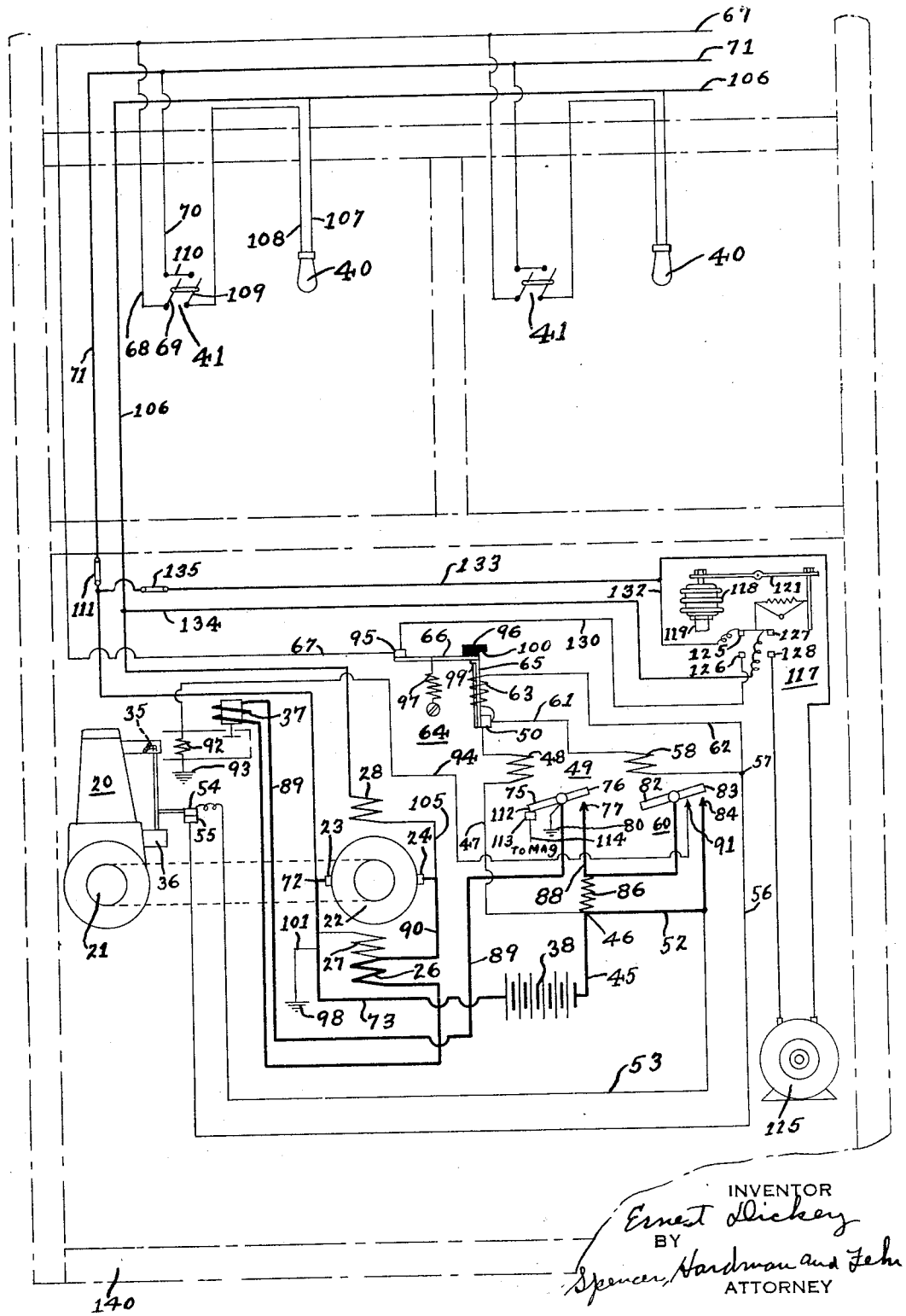

Patented Nov. 3, 1931

1,830,462

UNITED STATES PATENT OFFICE

ERNEST DICKEY, OF DAYTON, OHIO, ASSIGNOR TO DELCO-LIGHT COMPANY, OF DAYTON, OHIO, A CORPORATION OF DELAWARE

ELECTRICAL APPARATUS

Application filed April 30, 1929. Serial No. 359,352.

This invention relates to electrical generating systems.

One of the objects of the present invention is to provide an improved generating system of the type which is rendered operative by the closing of a single switch. More specifically it is an object to provide a system which may be rendered operative for supplying current at a plurality of places wherever current is to be consumed. In carrying out this object I have provided, in addition to the usual service mains, a third wire which is associated with one of the service mains to provide a control circuit by which the electrical system is rendered operative or inoperative.

A further object is to provide an improved system of control for rendering a relatively high voltage dynamo operative through a relatively low voltage source of supply, such as a storage battery, and provide for the charging of such low voltage battery by the high voltage dynamo.

Further objects and advantages of the present invention will be apparent from the following description, reference being had to the accompanying drawing, wherein a preferred form of the present invention is clearly shown.

In the drawing:

The figure in the drawing is a wiring diagram illustrating the present invention.

Referring to the drawing 20 designates a prime mover herein shown, for the sake of illustration, as an internal combustion engine having a shaft 21 connected with a dynamo 22 which operates, when driven by the prime mover as a relatively high voltage generator having main brushes 23 and 24 connected with the armature of the dynamo, and having a shunt field winding 27, and a series field winding 28 in series with a work circuit.

A throttle 35 for regulating the speed of the prime mover is adapted to be controlled by an engine speed responsive governor 36. A choke similar to the type disclosed in the copending application of Frank F. Starr, Serial Number 351,346 is used for forming a proper mixture of gasoline and air for starting the prime mover and is adapted to be actuated by the choke coil 37.

The dynamo 22 includes a starting series field winding 26 and also functions as a relatively low voltage motor, and is adapted to rotate the shaft 21 of the prime mover 20, when acting as a starting motor, receiving current from a relatively low voltage storage battery 38. During the starting of the prime mover 20, the current through the series winding 26 and through the shunt winding 27 is cumulative to produce a sufficient starting torque for cranking the prime mover.

When the dynamo 22 acts as a generator, the strength of the series field 28 will be increased or decreased in accordance with the load demand by the work circuit. As the field strength of the dynamo 22 increases or decreases, the governor 36 will regulate the throttle 35 for controlling the speed of the prime mover 20, and consequently cause the prime mover to drive the dynamo at the proper speed to maintain a substantially constant voltage output. During generating operation the dynamo 22 functions to supply current to a translating device or light 40 in a work circuit and to supply a charging current to the battery 38.

To start the prime mover 20 automatically when there is a demand for current by the work circuit, one of the switches 41 is closed. The switches 41 are preferably of the snap acting type, but for the sake of illustration I have shown diagrammatically double pole switches. The closing of one of the switches 41 causes current to flow from the battery through a control circuit comprising; battery 38, wire 45 to connecting point 46 where the current divides; part flowing through wire 47, magnet coil 48 of a switch 49 to contact point 50; from connecting point 46, current also flows through wire 52, wire 53 connected to wire 52, contacts 54 and 55, which are operatively connected with the governor 36, wire 56 to connecting point 57 where the current divides, part flowing through magnet coil 58 of a switch 60, wire 61 to contact point 50, and part from connecting point 57 through wire 62 and a heating coil 63 of a cranking cut-out 64, to contact point 50.

From contact point 50 current flows through bimetallic thermostatic blade 65, blade 66, wires 67 and 68, blade 69 of switch 41, wire 70 and service main 71 to connecting point 72 and wire 73 to the other side of the battery. Thus when switch 41 is closed three parallel circuits are completed through magnet coil 48, magnet coil 58 and heating coil 63.

The energizing of magnet coil 48 will cause the upward movement of an armature 75, forming a part of a switch 49, to engage contact 76 with a contact 77. The upward movement of the armature 75 will also disconnect the ground 80 from the magneto (not shown) thereby conditioning the magneto for operation. The energizing of magnet coil 58 will cause the upward movement of an armature 82, forming part of a switch 60, to engage contact 83 with a contact 84.

The closing of contacts 76 and 77 and contacts 83 and 84 establishes a cranking circuit between battery 38 and the dynamo 22 and completes a circuit around a resistance 86 and current will flow from the battery 38 to the dynamo 22 over the following circuit: battery 38, wire 45, wire 52, contacts 84 and 83, wire 88, contacts 77 and 76, wire 89, choke coil 37, series winding 26 of dynamo 22, wire 90, dynamo 22 and wire 73 to the other side of the battery.

Current flowing through the choke coil 37 during cranking operation, will cause this coil to actuate the choke for a short interval, namely, only when a heavy demand for current is made on the battery 38, which heavy demand is present only for a short interval.

The upward movement of the armature 82 will also engage contact 83 with a contact 91. The closing of contacts 83 and 91 allows current to flow from the battery 38 to a preheater 92 grounded at 93. The pre-heater 92 is adapted to heat the starting fuel mixture for the prime mover 20. The circuit from the battery through the pre-heater is as follows: battery 38, wires 45 and 52, contacts 84, 83 and 91, wire 94, pre-heater 92, ground 93, ground 98, wire 101, and wire 73 to the other side of the battery.

If the prime mover 20 should not start within a certain length of time abnormal discharge of the battery is prevented by the cranking cut-out 64 which includes the blades 65 and 66, and the heating coil 63. The blade 66 is fixed at contact point 95 and has a non-conducting block 96 secured thereto. The blade 66 is urged downwardly by a spring 97 to engage a flanged-end 99 of a bimetallic thermostatic blade 65, which blade is fixed at contact point 50. The thermostatic blade 65 is in heat receiving relation to the heating coil 63. While the prime mover is cranking, current is passing through this heating coil as previously described. If the cranking of the prime mover should continue for an abnormal period, for example one to two minutes, the thermostatic blade 65 will be heated sufficiently to cause it to bow to the right, as viewed in the drawing, until the flanged-end 99 moves to the right far enough to break its engagement with the blade 66 and is then retained in the shoulder 100 of the non-conducting block 96 by the downward movement of the blade 66. The separation of blades 66 and 65 will interrupt the flow of current through control circuit, and consequently the magnet coils 48 and 58 will become deenergized. When the coils 48 and 58 are deenergized the armatures 75 and 82 will descend by gravity to separate contacts 76 and 77 and contacts 83 and 84 thereby interrupting the flow of current from the battery to the dynamo 22.

During normal operation, when the prime mover 20 attains a certain speed, the governor 36 will actuate the contacts 54 and 55 to interrupt the flow of current to the magnet winding 58 and heating coil 63 of the cranking cut-out 64. The deenergization of magnet coil 58 will cause the separation of contact 83 from contacts 84 and 91 thereby interrupting the cranking circuit and rendering the resistance 86 effective, and interrupt the flow of current through the pre-heater 92.

The dynamo 22 then functions to supply current to the translating device or lights 40 in the work circuit and to supply charging current to the battery 38. The circuit from the dynamo 22 through the translating device 40 is as follows: brush 24, wire 105, series winding 28, service main 106, wire 107, translating device 40, wire 108, blade 109 of switch 41, wires 110 and 70, service main 71 including switch 111 to brush 23. The battery charging circuit from the dynamo 22 to the battery 38 is as follows: brush 24, wire 90, series winding 26, choke coil 37, wire 89, contacts 76 and 77, wire 88, resistance 86, wire 45, battery 38, and wire 73 to brush 23. During generating operation and when the dynamo is supplying current to the battery 38 the resistance 86 prevents the operation of the choke by reducing the amount of current passing through the coil 37.

When it is desired to render the system inoperative, all of the switches 41 must be open. This interrupts the circuit through the magnet coil 48. When the coil 48 becomes deenergized the armature 75 will descend by gravity to engage contact 112 with a contact 113 which contact has a wire 114 leading to the magneto, thereby grounding the magneto and rendering the prime mover inoperative.

This invention further contemplates controlling the supplying of current by the dynamo 22 to apparatus which is started and stopped automatically such as a motor which drives automatic machinery. An electric motor 115, is shown adapted for driving a refrigerator compressor or the like, and is controlled by a switch 117. The switch includes a bellows 118 having a pipe 119 which may be connected to any desirable part of the refrigerating system. As the pressure within said system builds up the bellows 118 will actuate a rod 121 to engage a contact 125 with a contact 126 and to engage contact 127 with a contact 128.

The closing of contacts 125 and 126 will complete a control circuit for automatically rendering the system operative. The closing of contacts 127 and 128 will complete a circuit between the dynamo 22 and the motor 115. The circuit from the battery 38 through the control circuit is as follows: battery to contact point 95, the same as previously described, wire 130, contacts 126 and 125, wire 132, service main 133, service main 71, and wire 73 to the other side of the battery. The circuit between the dynamo 22 and the motor 115 is as follows: brush 24, wire 105, series winding 28, service main 106, service main 134 including contacts 127 and 128, motor 115, service main 133 including switch 135, service main 71 to brush 73.

As the pressure within the refrigerating system recedes the bellows 118 will function to separate contacts 125 and 126, and contacts 127 and 128. The separation of contacts 127 and 128 will interrupt the flow of current to the motor 115. The separation of contacts 125 and 126 will interrupt the control circuit to render the system inoperative. In the event the dynamo 22 is operative to supply current to the lights 40, the system will not be rendered inoperative by the separation of the contacts 125 and 126 as the control circuit will in that case be completed through wire 67.

From the foregoing it will be noted that I have provided a relatively high voltage electrical generating system which will be rendered operative by a low voltage battery from a plurality of places by the closing of a single switch, and have arranged for rendering the system inoperative at these places. I have provided a simple system which is arranged in such manner that only one wire, in addition to the usual service mains, is necessary for starting and stopping same from any of a plurality of places.

In the drawing I have illustrated diagrammatically a structure 140 which includes a basement in which the entire generating apparatus may be installed, and a plurality of compartments, each of which is provided with a switch for rendering the system operative or inoperative. To simplify the installation, the service mains and the third wire may be installed in close parallel relation and directed to any place where it is desired to consume current.

In the event it is desired to utilize a generating system of this type for supplying current to churches, restaurants, theatres or the like, all of the lights may be connected in parallel with the light 40. In this manner all of the lights will be controlled and the system will be operated by the operation of a single switch.

From the foregoing it will also be noted that I have arranged for charging the low voltage battery by the high voltage dynamo. In providing for maintaining the battery in charged condition I have arranged a resistance device adapted to be effective only when the system is generating to thus reduce the value of the current going to the battery and this is accomplished by a simple arrangement of only two electromagnetic switches.

While the form of embodiment of the invention as herein disclosed, constitutes a preferred form, it is to be understood that other forms might be adopted, all coming within the scope of the claims which follow.

What is claimed is as follows:

1. An electrical generating system comprising, in combination, a prime mover, electrical apparatus adapted to operate as a motor for rendering the prime mover operative and adapted to operate as a generator when driven by the prime mover, a storage battery, a battery charging circuit between the electrical apparatus and the battery, a switch in said battery charging circuit, a motoring circuit between the battery and the electrical apparatus, a switch in said motoring circuit, means for simultaneously closing said switches, and means responsive to the operation of the prime mover for opening said second mentioned switch.

2. An electrical generating system comprising, in combination, a prime mover, electrical apparatus adapted to operate as a motor for rendering the prime mover operative and adapted to operate as a generator when driven by the prime mover, a storage battery, a battery charging circuit between the electrical apparatus and the battery, a switch in said battery charging circuit, a prime mover control device rendered operable by said switch, a motoring circuit between the battery and electrical apparatus, a switch in said motoring circuit, means for closing said switches, and means responsive to the operation of the prime mover for opening the second mentioned switch.

3. An electrical generating system comprising, in combination, a prime mover, electrical apparatus adapted to operate as a motor for rendering the prime mover operative and adapted to operate as a generator when driven by the prime mover, a storage battery, a battery charging circuit between the electrical apparatus and the battery, a switch in said battery charging circuit, a prime mover control device rendered operable by said switch, a motoring circuit between the battery and electrical apparatus, a switch in said motoring circuit, means for simultaneously closing said switches, and means responsive to the operation of the prime mover for opening the second mentioned switch.

4. An electrical generating system comprising, in combination, a prime mover, service mains, electrical apparatus connected with the service mains, said electrical apparatus being adapted to operate as a motor for rendering the prime mover operative and adapted to operate as a generator when driven by the prime mover, a storage battery, a battery charging circuit between the electrical apparatus and the battery, a switch in said battery charging circuit, a motoring circuit between the battery and the electrical apparatus, a switch in said motoring circuit, means responsive to a demand for current for simultaneously closing said switches, and means responsive to the operation of the prime mover for opening the second mentioned switch.

5. An electrical generating system comprising, in combination, a prime mover, service mains, electrical apparatus connected with the service mains, said electrical apparatus being adapted to operate as a motor for rendering the prime mover operative and adapted to operate as a generator when driven by the prime mover, a storage battery, a battery charging circuit between the electrical apparatus and the battery, a switch in said battery charging circuit, a motoring circuit between the battery and the electrical apparatus, a switch in said motoring circuit, a switch for controlling the flow of current to the service mains, a circuit including the battery and one of the service mains adapted to be closed by the last mentioned switch, means responsive to the flow of current in said last mentioned circuit for simultaneously closing the first and second mentioned switches, and means responsive to the operation of the prime mover for opening the second mentioned switch.

6. An electrical generating system comprising, in combination, a prime mover, a storage battery, electrical apparatus adapted to operate as a motor for rendering the prime mover operative and as a generator for charging the battery when driven by the prime mover, a motoring circuit including a switch, a battery charging circuit including a switch, electro-magnets simultaneously energized by the battery and responsive to a demand for current by the mains for actuating said switches, said electro-magnets being connected in parallel circuit relation, a switch for closing the circuits of said electro-magnets and means responsive to the operation of the prime mover for rendering the electro-magnet controlling the motoring switch ineffective.

7. An electrical generating system comprising, in combination, a prime mover, a storage battery, electrical apparatus adapted to operate as a motor for rendering the prime mover operative and as a generator for charging the battery when driven by the prime mover, a motoring circuit including a switch, a battery charging circuit including a switch, electro-magnets for actuating said switches, said electro-magnets being connected in parallel circuit relation, a switch in series relation with said electro-magnets, and means operable in the event of fruitless cranking of the prime mover for actuating the contacts of said last mentioned switch.

In testimony whereof I hereto affix my signature.

ERNEST DICKEY.